US012809815B1

(12) United States Patent
Leong et al.

(10) Patent No.: US 12,809,815 B1
(45) Date of Patent: Nov. 24, 2026

(54) HARDWARE ACCELERATED LINEAR SCALING OF OPERANDS AND RESULTS

(71) Applicant: ETCHED.AI INC., San Jose, CA (US)

(72) Inventors: Reynold Leong, Foster City, CA (US); Tom Shlomi, Cupertino, CA (US); Saptadeep Pal, Sunnyvale, CA (US); Hsu-Kuei Lin, Mountain View, CA (US)

(73) Assignee: ETCHED.AI INC., San Jose, CA (US)

( * ) Notice: Subject to any disclaimer, the term of this patent is extended or adjusted under 35 U.S.C. 154(b) by 0 days.

(21) Appl. No.: 19/640,116

(22) Filed: Apr. 6, 2026

(51) Int. Cl.
*G06F 15/80* (2006.01)
*G06F 3/06* (2006.01)
*G06F 13/16* (2006.01)

(52) U.S. Cl.
CPC ........ *G06F 15/8046* (2013.01); *G06F 3/0656* (2013.01); *G06F 13/1673* (2013.01)

(58) Field of Classification Search
CPC ............. G06F 15/8046; G06F 13/1673; G06F 3/0656; G06F 9/3877
See application file for complete search history.

(56) References Cited

U.S. PATENT DOCUMENTS

2018/0307438 A1* 10/2018 Huang .................... G06F 17/16
2025/0045240 A1* 2/2025 Elbtity .................. G06F 7/5443
2025/0190177 A1* 6/2025 Rock ....................... G06F 15/80

OTHER PUBLICATIONS

Jiaziang Zou, Yonghao Chen, Xingyu Chen, Chenxi Xu and Xinyu Chen, "AxCore: A Quantization-Aware Approximate GEMM Unit for LLM Inference", Oct. 17, ACM, pp. 839-853 (Year: 2025).*

* cited by examiner

*Primary Examiner* — Courtney P Spann
(74) *Attorney, Agent, or Firm* — Maschoff Brennan

(57) ABSTRACT

A system and method for hardware accelerated linear scaling of operands and results associated with matrix operations. A plurality of processing units are coupled in a chain, each associated with a different portion of a compute array. A controller retrieves transformation parameters from a memory and sequentially provides values to a first processing unit over successive time intervals. The processing units sequentially forward the values to downstream processing units along the chain, causing each processing unit to apply the transformation parameters to data passing through its respective portion of the compute array. The cascaded distribution amortizes off-chip memory latency across the width of the compute array, enabling pipelined operation without latency-induced gaps. A double-buffered on-chip memory in the controller hides external memory access latency by alternating between buffers during parameter retrieval and distribution.

30 Claims, 6 Drawing Sheets

200

HARDWARE ACCELERATED LINEAR SCALING OF OPERANDS AND RESULTS

FIELD

The embodiments discussed in the present disclosure are related to hardware accelerated linear scaling of operands and results.

BACKGROUND

Unless otherwise indicated in the present disclosure, the materials described in the present disclosure are not prior art to the claims in the present application and are not admitted to be prior art by inclusion in this section.

The ubiquity of artificial intelligence (AI) models and other processing intensive computations has increased the demand for systems that can perform intensive computations quickly and/or efficiently. To perform these intensive computations, a system may include a compute array configured to perform tensor operations. The compute array may include any suitable hardware structure for performing matrix or tensor operations, including but not limited to a systolic array, a matrix engine, a dot-product engine, a tensor processing unit, or other hardware accelerator structure. For example, a systolic array may include a network of processing elements (PEs) arranged in rows and columns. Operands (e.g., input data) may be fed into the columns (or batches) of the compute array and the corresponding PEs may perform corresponding tensor operations (e.g., multiplication, division, addition, or subtraction) on the operands and pass results (e.g., output data) to downstream devices. The techniques described herein are applicable to any such compute array.

As transformer models increase or become more complex, aspects of the transformer models, such as dimensions or layers may increase. Increasing the aspects of the transformer model may cause a magnitude of the results to increase and become unstable. For example, the magnitude of the results increasing may cause saturation to occur. Saturation may occur when the results exceed a range of a numeric format employed by the system. These issues may impact subsequent functions (e.g., attention functions) of the transformer model.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In an example embodiment, a system includes a compute array configured to perform matrix operations, a plurality of processing units coupled in a chain with each processing unit coupled to a different portion of the compute array, and a controller configured to retrieve transformation parameters from a memory and sequentially provide values of the transformation parameters to a first processing unit of the chain over a plurality of successive time intervals. The plurality of processing units sequentially forward the values of the transformation parameters to downstream processing units along the chain, causing each processing unit to apply the values to data associated with the matrix operations. This cascaded distribution amortizes off-chip memory latency across the width of the compute array, enabling the processing units to operate in a pipelined manner without introducing latency-induced gaps.

BRIEF DESCRIPTION OF THE DRAWINGS

Example embodiments will be described and explained with additional specificity and detail through the use of the accompanying drawings in which.

DETAILED DESCRIPTION

Figure 1A:
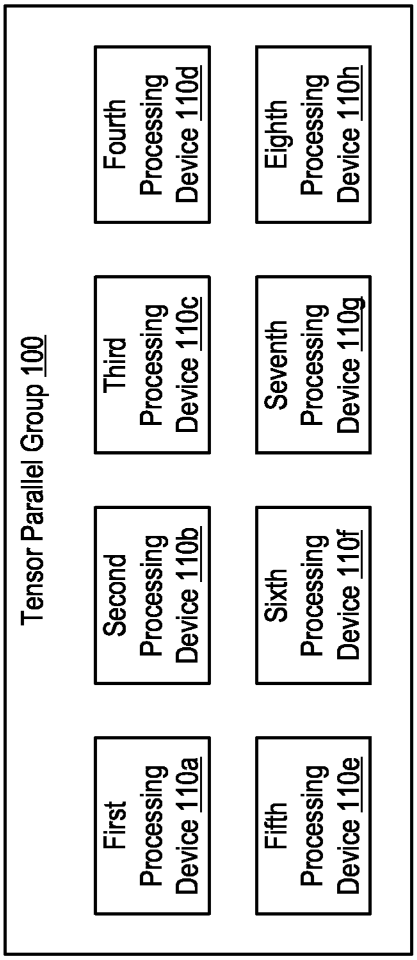
FIGS. 1A and 1B illustrate aspects of an example tensor parallel group for performing tensor operations.

The system may perform scaling operations on the operands, the results, or both using values of affine data to maintain stability of the results and avoid saturation. The affine data may include scale values (e.g., model scale values or batch scale values) and bias values (e.g., model bias values or batch bias values) that are applied to the operands or the results during the scaling operations. For example, an operand or a result may be multiplied by a corresponding scale value to get a product and the product may be added to a corresponding bias value.

A total number of the values of the affine data may be large, which may cause the affine data to be too large to be stored in an on-chip memory. Consequently, the affine data may be stored in an off-chip memory. For example, the affine data may be stored in a high-bandwidth memory (HBM) of the system. The off-chip memory may provide higher storage capabilities than the on-chip memory. However, the off-chip memory may introduce latency when retrieving the values of the affine data. In addition, a bandwidth of the off-chip memory may be shared between different operations of the system, which may create bandwidth contention.

The values of the affine data may be retrievable from the off-chip memory at a rate that is slower than a rate at which intermediate processing units (IPUs) of the system receive the operands or the results. As a result, the latency of the off-chip memory may cause the values of the affine data to arrive at the IPUs after corresponding operands or results are already received. Therefore, the latency of the off-chip memory may cause the IPUs to wait for the values to arrive before being able to apply them to the operands or the results. This delay may create gaps (e.g., bubbles) in the tensor operations of the systolic array. Further, this delay in the tensor operations of the systolic array may reduce a throughput rate of the systolic array.

The present disclosure provides techniques for avoiding or reducing the technical difficulties described above. Some embodiments described in the present disclosure include a system that provides hardware accelerated linear scaling of the operands or the results. The embodiments of the present disclosure may allow the IPUs to apply the values of the affine data in parallel to multiple instances of the operands or the results that correspond to multiple columns of the systolic array. For example, the embodiments of the present disclosure may apply the values of the affine data in parallel across hundreds or more (e.g., one thousand twenty-four) columns of the systolic array.

In an example, a system may include an IPU and systolic array controller (ISC) and the IPUs. The IPUs may be coupled in a chain (e.g., cascaded). Each of the IPUs may be coupled to a different column of the systolic array. In addition, each of the IPUs may be configured to apply the values of the affine data to corresponding operands to scale the operands for tensor operations by a corresponding column of the systolic array. The ISC may be coupled to a first IPU. The ISC may retrieve the affine data from the off-chip memory (e.g., the HBM, a double data rate (DDR) memory, or a thyristor random access memory (TRAM)). The ISC may also provide the values of the affine data sequentially to the first IPU over multiple clock cycles. The IPUs may sequentially forward the values of the affine data to downstream IPUs along the chain to cause the IPUs to sequentially apply the values of the affine data to the corresponding operands over the multiple clock cycles.

In another example, each of the IPUs may be configured to apply the values of the affine data to corresponding results to scale the results for subsequent operations as part of a transformer model. The ISC may provide the values of the affine data sequentially to the first IPU over multiple clock cycles. The IPUs may sequentially forward the values of the affine data to downstream IPUs along the chain to cause the IPUs to sequentially apply the values of the affine data to the corresponding results over the multiple clock cycles.

More generally, the techniques described herein may be applied to any system that includes a compute array having a plurality of portions (e.g., columns, rows, lanes, or segments), a plurality of processing units coupled in a chain with each processing unit associated with a different portion of the compute array, and a controller that retrieves transformation parameters from a memory and sequentially provides them to a first processing unit in the chain. The processing units sequentially forward the transformation parameters to downstream processing units along the chain. As used herein, the term "compute array" refers to any hardware structure configured to perform matrix operations or tensor operations, including but not limited to a systolic array, a matrix engine, a tensor processing unit, a vector processing unit, or similar hardware. The term "processing unit" refers to any circuit or logic block configured to apply a data transformation (e.g., an affine transformation) to data passing through or associated with a portion of the compute array, including but not limited to an intermediate processing unit (IPU). The term "controller" refers to any circuit or logic block configured to retrieve transformation parameters from memory and distribute them to the processing units, including but not limited to an IPU and systolic array controller (ISC). The term "transformation parameters" or "affine data" refers to any set of values used to apply a linear or affine transformation to data, including but not limited to scale values, bias values, normalization parameters, or quantization parameters.

The ISC may retrieve and store the values of different parts of an operand portion of the affine data in an alternating arrangement. For example, during an initialization portion of the scaling operations, the ISC may retrieve and store a first part of the operand portion in the on-chip memory and while the IPUs are applying the values of the first part of the operand portion, the ISC may retrieve and store a second part of the operand portion in the on-chip memory. In other words, the ISC may perform a bulk retrieval of the transformation parameters. As another example, while the IPUs are applying the values of the second part of the operand portion, the ISC may retrieve and store a third part of the operand portion in the on-chip memory. Consequently, the system of the present disclosure may only experience the latency of the off-chip memory during the initialization portion of the scaling operations. Additionally, the system of the present disclosure may amortize the latency of the off-chip memory during the initialization portion over the entire scaling operations. The operand portion of the affine data may include values that are to be applied to operands that are being provided to the systolic array.

The ISC may initially retrieve and store the values of a first part of a result portion of the affine data and then individually retrieve and store subsequent values of the result portion in a sequential (e.g., a first in first out) arrangement. The first part of the result portion may be large enough, that when stored in the on-chip memory a sufficiently long enough queue of values is created to compensate for the latency of the off-chip memory related to retrieving the subsequent values of the result portion. In some embodiments, the ISC may retrieve and store the values of the first part of the results portion while the IPUs are applying values of the operand portion (e.g., pre-load). Accordingly, the ISC may be ready to provide the values of the first part of the result portion upon providing a last value of the operand portion. The result portion of the affine data may include values that are to be applied to results that are generated by the systolic array.

In some embodiments of the present disclosure, a number of sets of the scale values (e.g., the batch and model scale values) of the affine data and a number of sets of the bias values (e.g., the batch and model bias values) of the affine data may be equal to dimensions of the tensor operations (e.g., dimensions of matrices being multiplied). Accordingly, the number of the sets of the scale values may be equal to the number of columns in the systolic array. The number of the sets of the scale values and the number of the sets of the bias values being equal to the number of columns in the systolic array may reduce or eliminate bottlenecks due to sharing the values among the columns.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

Figure 1B:
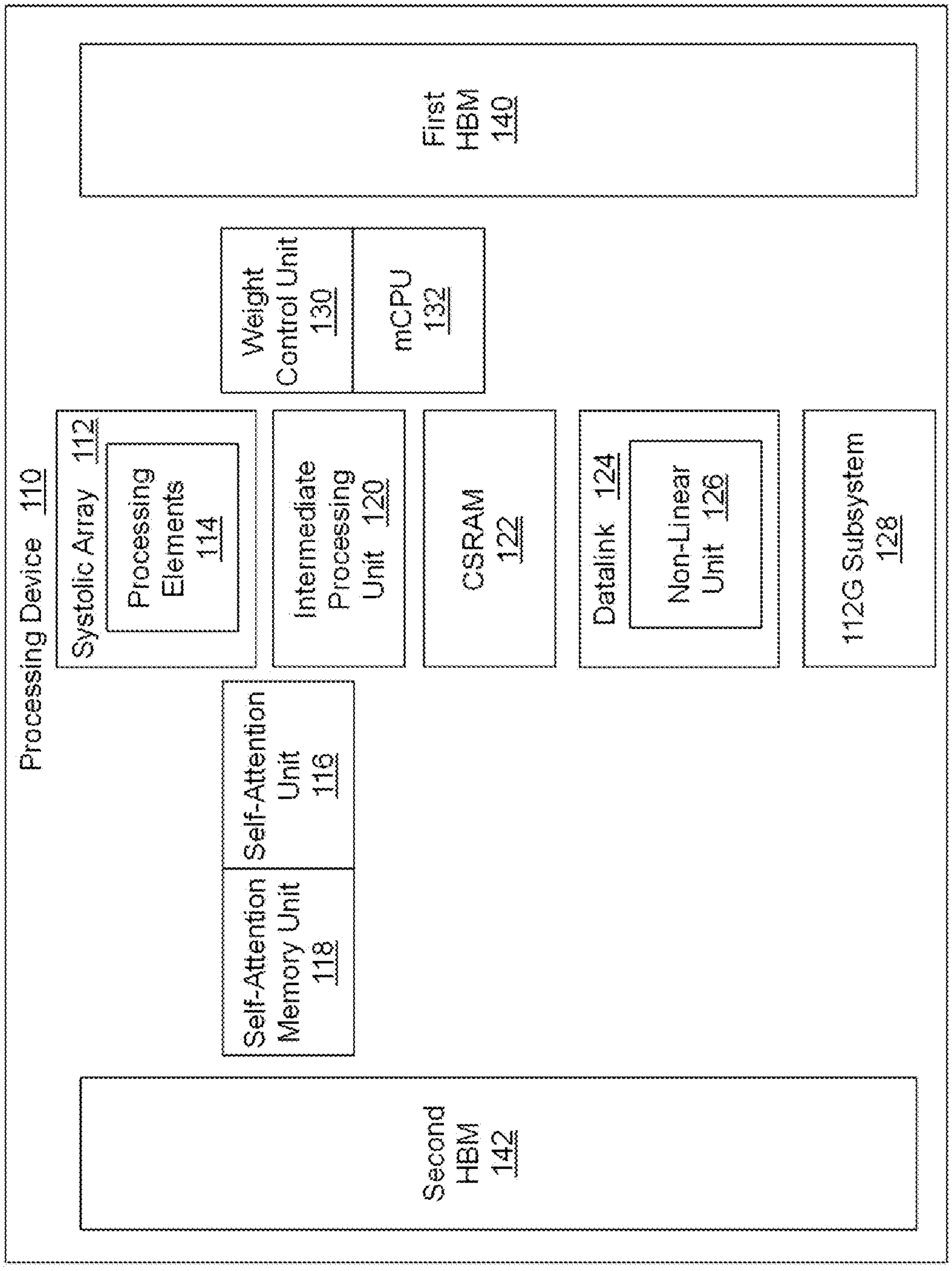

FIGS. 1A and 1B illustrate aspects of an example tensor parallel group 100 for performing tensor operations, in accordance with embodiments of the subject technology. FIG. 1A depicts a tensor parallel group 100 including multiple processing devices 110 (for example, eight processing devices denoted 110*a* through 110*h*), which are referred to collectively as processing devices 110. FIG. 1B provides a detailed block diagram of the internal architecture of a representative processing device 110.

In an embodiment, each processing device 110 is an integrated circuit (chip) that incorporates multiple specialized compute blocks and is coupled to high-bandwidth memory blocks. Specifically, each processing device 110 includes at least one systolic array 112 (comprising an array of interconnected processing elements 114) for performing matrix multiplication operations, a nonlinear processing unit 126 for performing non-linear and other element-wise operations (e.g., activation functions and normalization), and a self-attention unit 116 for performing attention computations. Each processing device 110 further includes a central static random-access memory (SRAM) 122 on-chip to store intermediate values (such as partial results, activations, or other tensor data) and to facilitate data exchange among the compute blocks. In the depicted embodiment, each processing device 110 is coupled to a set of high-bandwidth memory (HBM) modules on one side of the chip (designated first HBM 140) and another set of HBM modules on the opposite side (designated second HBM 142). In some embodiments, the first HBM 140 is used primarily to store relatively static data such as model parameters (e.g., weight matrices for the neural network), whereas the second HBM 142 is used to store more dynamic data such as key (K) and value (V) matrices generated during self-attention operations. In some embodiments, the type of data stored in first HBM 140 and second HBM 142 may be switched, i.e., the first HBM 140 may be used to store more dynamic data such as key (K) and value (V) matrices generated during self-attention operations and second HBM 142 may be used to store relatively static data such as model parameters (e.g., weight matrices for the neural network). In some embodiments, first HBM 140 and second HBM 142 may store both types of data and/or other types of data.

In an implementation, the systolic array 112 is restricted to read-only access to first HBM 140 to optimize throughput, but a host CPU (not shown in FIGS. 1A and 1B) maintains write access to all HBM modules (e.g., via a PCIe interface, and the like) for model loading and configuration.

Referring also to FIG. 1B, each processing device 110 includes various additional sub-components that facilitate data flow and control of the above compute and memory blocks. For example, an intermediate processing unit (IPU 120) is coupled between the central SRAM 122 and the systolic array 112, and operates to transfer input data from the SRAM 122 into the systolic array 112 and to return the output results from the array back into the SRAM 122, and can apply on-the-fly scaling or bias adjustments to the data during these transfers. A weight control unit (WCU 130) is responsible for fetching static model weight parameters from the first HBM 140 and supplying them to the systolic array 112 (e.g., via the IPU 120) as needed for matrix multiplication operations. A self-attention memory unit (SAMU 118) manages the handling of key and value matrices with respect to the second HBM 142: during operation it writes newly generated key and value matrices from the self-attention unit 116 to the second HBM 142 for storage, and retrieves previously stored key/value data from the second HBM 142 to supply the self-attention unit 116 when needed for computing attention for later tokens.

A data routing and control bus (datalink 124) coordinates the movement of data among the major functional blocks of the processing device 110, including transfers between the central SRAM 122, the self-attention unit 116, the inter-chip communication interface (e.g., 112G Subsystem 128), and other components. The non-linear unit 126, which is operatively associated with the datalink 124 or included as part of the datalink 124, performs a plurality of element-wise vector operations (e.g., including but not limited to activation functions, normalizations, and residual additions, typically utilizing piecewise-polynomial approximations for high-efficiency computation on small data types such as FP8 or BF16) on tensor data stored in the central SRAM 122 (for example, by evaluating a piecewise-polynomial approximation of a selected non-linear activation function, as described herein). Each processing device 110 also includes an on-chip controller (mCPU 132) that orchestrates and synchronizes the operation of the compute and memory blocks, issues configuration commands (e.g., setting the dimensions for the systolic array 112 or controlling the mode of the self-attention unit 116), and manages data exchanges with external systems via host interfaces. Finally, a high-speed chip-to-chip communication interface (112G Subsystem 128) is provided to enable direct data exchange among the processing devices 110, allowing the tensor parallel group 100 to perform collective operations (such as all-gather and all-reduce) and share intermediate results with at most a single intermediate hop between any two devices.

Each of the compute blocks in a processing device 110 is operatively connected to the memory blocks in a manner that provides high-speed data transfer for its specific function, as summarized in Table 1:

TABLE 1

Compute and Data Block Interconnections in Each Processing Device

| Compute Block (Function) | Associated Memory/Data Blocks | Interconnections and Data Flow |
|---|---|---|
| Systolic Array 112 (Matrix Multiply Unit) | First HBM 140 (model weight storage); CSRAM 122 (on-chip buffer for activations & partial results) | Reads one input matrix (e.g., a weight matrix or other static model parameters) from first HBM 140 and reads the other input (e.g., an input activation or intermediate result matrix) from the on-chip CSRAM 122. Performs matrix multiplication via the array of processing elements 114, and writes the resulting output matrix back to the CSRAM 122 for subsequent use by other units. |
| Nonlinear Unit 126 (Activation/Normalization Unit) | CSRAM 122 (on-chip intermediate data storage); (Optional coefficient memory for polynomial segments) | Reads intermediate values (e.g., outputs of a prior matrix multiplication or attention operation) from CSRAM 122; applies nonlinear functions or other element-wise operations (which may be implemented via a piecewise-polynomial approximation using preloaded coefficients) to this data; |

TABLE 1-continued

Compute and Data Block Interconnections in Each Processing Device

| Compute Block (Function) | Associated Memory/Data Blocks | Interconnections and Data Flow |
|---|---|---|
| | | writes the processed results back to CSRAM 122 for further use. |
| Self-Attention Unit 116 (Attention Processing Unit) | Second HBM 142 (dynamic Key/Value storage); CSRAM 122 (on-chip buffer for Query & outputs) | In "store-KV" mode: reads newly computed Key (K) and Value (V) matrices from CSRAM 122 and writes them to second HBM 142 via the self-attention memory unit 118 |

Through these interconnections, each processing device 110 can perform complex tensor computations for transformer-based machine learning models with high efficiency and throughput. For example, a multi-layer perceptron (MLP) layer of a transformer model can be executed by using the systolic array 112 to multiply an input activation matrix (retrieved from CSRAM 122) by a weight matrix (retrieved from first HBM 140 via the weight control unit 130), writing the result to CSRAM 122; then using the non-linear unit 126 to apply an activation function or normalization to the resulting matrix (reading from and writing to CSRAM 122); and then using the systolic array 112 again to multiply the transformed data by a second weight matrix from first HBM 140, and writing that output back to CSRAM 122. In an attention layer of the transformer, the processing device 110 first uses the systolic array 112 (optionally followed by the non-linear unit 126 for any required normalization) to compute the query (Q), key (K), and value (V) matrices from the input (writing these matrices into CSRAM 122). The self-attention unit 116 then operates in "store-KV" mode to transfer the K and V matrices from CSRAM 122 to the second HBM 142 (for example, via the self-attention memory unit 118). When performing the actual attention calculation for a given query (e.g., during a decoder step processing a new token), the self-attention unit 116 switches to the attention-compute mode, streaming the required K and V data from second HBM 142 while reading the current Q vector from CSRAM 122. The self-attention unit 116 computes dot-product attention scores (Q K) for the current token against the stored keys and applies an online (streaming) softmax technique (analogous to Flash Attention) to these scores, thereby generating normalized attention weights without needing to buffer all scores simultaneously and enabling processing of large context lengths that exceed the buffer capacity of the CSRAM 122. Using these weights, the self-attention unit 116 multiplies each corresponding V (retrieved from second HBM 142) by its weight and accumulates the products to produce a "context" output (i.e., a weighted sum of the values) which is written into CSRAM 122. This context output may then be provided to subsequent layers or offloaded as a final result. The organization of the compute components and local memory within each processing device 110 (systolic array 112 with first HBM 140, self-attention unit 116 with second HBM 142, and shared CSRAM 122 for intermediate data) advantageously localizes high-bandwidth data transfers on-chip, thereby reducing external memory traffic and maximizing processing throughput.

In a multi-chip configuration, any or all of the processing devices 110 in the tensor parallel group 100 can be communicatively coupled via the 112G Subsystem 128 or other high-speed links to operate together on larger tensor workloads. For example, the processing devices 110 may be interconnected in a topology that allows each device to communicate with any other device with no more than one intermediate hop (such as a radial or mesh network), enabling efficient broadcasting and reduction of tensor data across devices. This interconnection allows the system to distribute portions of a large tensor computation across multiple chips and to exchange intermediate results (using collective communication operations orchestrated by the mCPU 132) such that the group 100 functions as a unified parallel processor for neural network inference or training tasks.

This arrangement of compute blocks (112, 116, 126) and data/memory blocks (122, 140, 142) within each processing device 110, together with the coordinated operation of support components (120, 124, 130, 118, 128, 132) and the ability to interconnect multiple devices, provides a flexible, high-throughput architecture optimized for executing transformer-type machine learning models. The inclusion of dedicated logic for dense matrix multiplication, non-linear function evaluation, and self-attention operations (each tightly coupled with appropriate on-chip and off-chip memory structures) helps ensure that each class of computation is executed efficiently with minimal extraneous data movement. The described design thereby enables high utilization of compute resources and memory bandwidth across different phases of a workload, yielding a robust and fully enabled implementation of advanced tensor computations.

Figure 2:
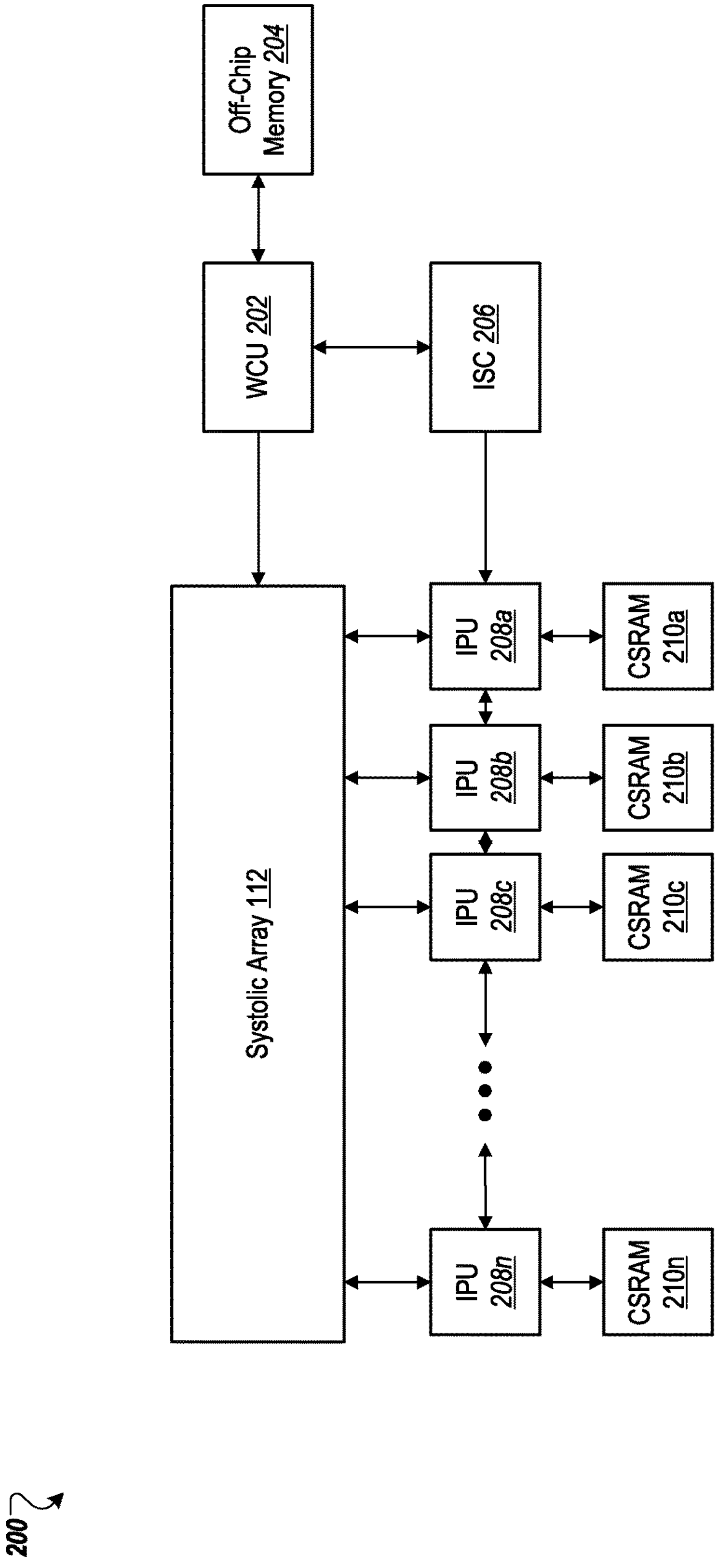
FIG. 2 illustrates an example of a system that includes a compute array (e.g., the systolic array of FIG. 1B), a controller, and a chain of processing units.

FIG. 2 illustrates an example of a system 200 that includes the systolic array 112 of FIG. 1B, in accordance with at least one embodiment described in the present disclosure. More generally, the system 200 may be referred to as a hardware accelerator and the techniques described herein are applicable to any hardware accelerator that includes a compute array, processing units, and a controller as described. The system 200 may include the systolic array 112, a weight control unit (WCU) 202, an off-chip memory 204, an ISC 206, IPUs 208*a-n*, or central static random access memories (CSRAMs) 210*a-n*. The off-chip memory 204 may correspond to the first HBM 140 or the second HBM 142 of FIG. 1B. The off-chip memory 204 may include any appropriate off-chip memory structure such as an HBM, a DDR memory, a TRAM, an LPDDR memory, a GDDR memory, a CXL-attached memory, or any other suitable external memory. More generally, the systolic array 112 may be referred to as a compute array, the ISC 206 may be referred to as a controller, the IPUs 208*a-n* may be referred to as processing units, and the CSRAMs 210*a-n* may be referred to as local memories. The techniques described with respect to the system 200 may be applied to systems using any suitable compute array, controller, processing units, and local memories, and are not limited to the specific implementations described herein. The CSRAMs 210*a-n* may correspond to parts or the whole CSRAM 122 of FIG. 1B. The WCU 202 may correspond to the WCU 130 of FIG. 1B.

As indicated by the ellipsis and the Nth IPU 208*n* in FIG. 2, the system 200 may include any appropriate number of IPUs 208*a-n*. For example, the number of the IPUs 208*a-n* may be equal to the number of columns of PEs of the systolic array 112. In addition, as indicated by the ellipsis and the Nth CSRAM 210*n* in FIG. 2, the system 200 may include any appropriate number of CSRAMs 210*a-n*. For example, the number of the CSRAMs 210*a-n* may be equal to the number of the IPUs 208*a-n*.

As shown in FIG. 2, the IPUs 208*a-n* are coupled in a chain (e.g., cascaded) or arranged in a chain. For example, the first IPU 208*a* may be coupled to the second IPU 208*b*, the second IPU 208*b* may be coupled to the third IPU 208*c*, and so on along the chain to the Nth IPU 208*n*. In addition, each of the IPUs 208*a-n* may be coupled to a different column of PEs (not shown) of the systolic array 112. For example, the first IPU 208*a* may be coupled to a first column of the systolic array 112, the second IPU 208*b* may be coupled to a second column of the systolic array 112, and so on. Further, each of the IPUs 208*a-n* may be coupled to different instances of the CSRAMs 210*a-n*. For example, the first IPU 208*a* may be coupled to a first CSRAM 210*a*, the second IPU 208*b* may be coupled to a second CSRAM 210*b*, and so on.

More generally, the chain of processing units may be coupled to respective portions of any compute array. Each processing unit in the chain may receive transformation parameters from an upstream processing unit (or from a controller for the first processing unit in the chain), apply the transformation parameters to data associated with the corresponding portion of the compute array, and forward the transformation parameters to a downstream processing unit in the chain. This cascaded distribution of transformation parameters amortizes the latency of retrieving the parameters from an external memory across the width of the compute array, enabling all processing units to operate in a pipelined manner without introducing latency-induced gaps in the compute array's operations.

The IPUs 208*a-n* may receive the results from the corresponding columns of PEs of the systolic array 112. In addition, the IPUs 208*a-n* may receive the operands from the corresponding instances of the CSRAMs 210*a-n*. The IPUs 208*a-n* may be configured to apply the values of the affine data to the operands, the results, or both. The IPUs 208*a-n* may apply the values of the affine data to the operands to scale the operands for tensor operations by the corresponding columns of PEs. The IPUs 208*a-n* may apply the values of the affine data to the results (e.g., results generated by the compute array) to scale the results for subsequent operations by downstream devices.

The ISC 206 may be coupled to the WCU 202 and the first IPU 208*a*. The ISC 206 may control the flow of the values of the affine data through the IPUs 208*a-n*. The ISC 206 may include an on-chip memory (such as numbered 312 and 314 in FIG. 3). The ISC 206 may retrieve parts of the affine data from the off-chip memory 204 via the WCU 202. For example, during an initialization portion of the scaling operations, the ISC 206 may retrieve a first part of the affine data from the off-chip memory 204 via the WCU 202. As another example, during subsequent portions of the scaling operations, the ISC 206 may retrieve additional parts of the affine data from the off-chip memory 204 via the WCU 202.

The ISC 206 may store different parts of the affine data in the on-chip memory at different points of time. For example, the ISC 206 may store the first part of the affine data in the on-chip memory during the initialization portion and the subsequent parts of the affine data in the on-chip memory during the subsequent portions of the scaling operations. The on-chip memory may include multiple buffers or caches for storing the values of the affine data. For example, the on-chip memory may include a first on-chip buffer or cache configured to store a part of the affine data independent of a second on-chip buffer or cache that is separate or independent of the first on-chip buffer or cache.

More generally, the controller may include a double-buffered or multi-buffered on-chip memory. While the controller provides transformation parameters from a first buffer to the chain of processing units, a second buffer concurrently receives subsequent transformation parameters from the external memory. This alternating arrangement hides the external memory access latency after an initial fill period, enabling continuous operation of the processing units without stalls. The double-buffered arrangement is not limited to the specific ISC and on-chip memory implementations described herein and may be applied to any controller that distributes transformation parameters to a chain of processing units. Furthermore, the techniques and operations described herein are not limited to chain or cascade topologies. In some embodiments, the controller may distribute the transformation parameters to the plurality of processing units using any suitable interconnection topology, including but not limited to a chain (cascade), a tree, a star, a ring, a mesh, a broadcast bus, or any combination thereof. The multi-buffered on-chip memory hides the external memory access latency regardless of the distribution topology used.

Figure 4:
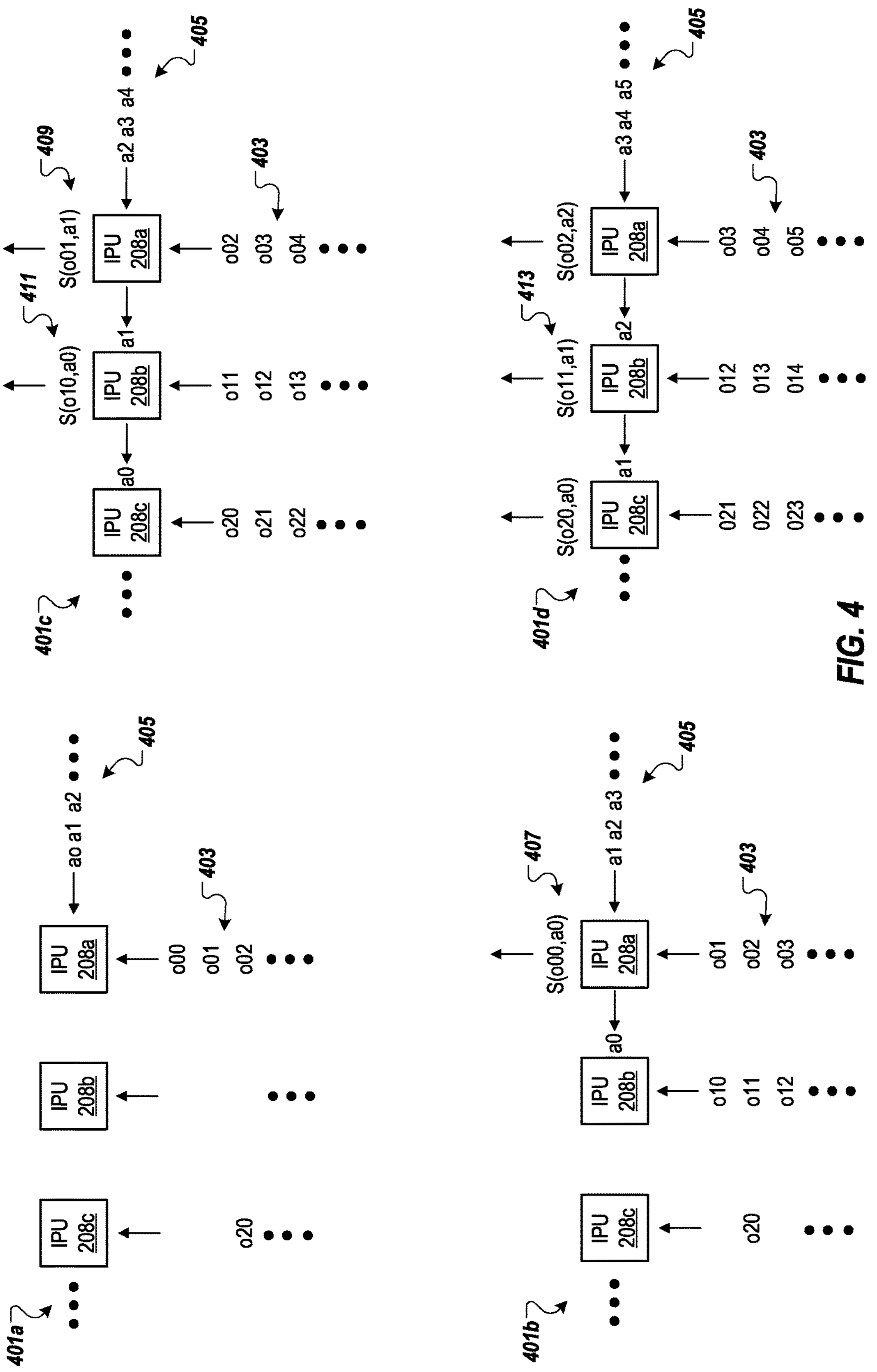
FIG. 4 illustrates example flows of operands and affine data during multiple clock cycles.

FIG. 4 illustrates example flows of operands 403 and affine data 405 during multiple clock cycles 401*a-d*, in accordance with at least one embodiment of the present disclosure. In FIG. 4, the operands 403 are formatted in accordance with "oij" in which "o" identifies it as an operand, "i" represents a column index, and "j" represents a value index. For example, "o01" represents an operand corresponding to the first column of the systolic array 112 and a second value of the affine data. The values of the affine data 405 are formatted in accordance with "aj" in which "a" identifies it as a value of the affine data 405 and "j" represents the value index. For example, "a2" represents a third value of the affine data.

With combined reference to FIGS. 2-4, scaling operations of the system 200 to scale the operands by the values of a first part of the affine data 405 (e.g., a first part of the affine data)(generally referred to in the present disclosure as the first part) will now be discussed. The first part may correspond to the operands of the system 200. In other words, the first part may be part of the operand portion of the affine data 405. The ISC 206 may retrieve the first part from the off-chip memory 204 through the WCU 202. The ISC 206 may retrieve the first part prior to the IPUs 208*a-n* applying the values of the first part or any other part of the affine data 405 to the operands 403.

The ISC 206 may provide the values of the first part sequentially to the first IPU 208*a* over multiple successive clock cycles. For example, as shown in FIG. 4, during a first clock cycle 401*a*, the ISC 206 may provide a first value ("a0") to the first IPU 208*a* and during a second clock cycle 401*b*, the ISC 206 may provide a second value ("a1") to the first IPU 208*a*. The ISC 206 may continue to sequentially provide values of the first part to the first IPU 208*a* over successive clock cycles in this manner. For example, as shown in FIG. 4, during a third clock cycle 401*c*, the ISC 206 may provide a third value ("a2") to the first IPU 208*a* and during a fourth clock cycle 401*d*, the ISC 206 may provide a fourth value ("a3") to the first IPU 208*a*.

The first IPU 208*a* may sequentially apply the received values of the first part to corresponding operands over successive clock cycles to produce a first set of scaled operands (generally referred to in the present disclosure as the first set). For example, during the first clock cycle 401*a*, the first IPU 208*a* may apply the first value ("a0") to a corresponding first operand ("o00") from the first CSRAM 210*a* to produce a first scaled operand 407 ("S(o00,a0)") of the first set. As another example, during the second clock cycle 401*b*, the first IPU 208*a* may apply the second value ("a1") to a corresponding second operand ("o01") from the first CSRAM 210*a* to produce a second scaled operand 409 ("S(o01,a1)") of the first set.

The first IPU 208*a* may sequentially provide the first set to the first column of PEs over successive clock cycles. For example, the first IPU 208*a* may sequentially provide the first scaled operand 407 and the second scaled operand 409 of the first set to the first column of the PEs during the second clock cycle 401*b* and the third clock cycle 401*c*, respectively. In this manner, the first IPU 208*a* may concurrently apply values of the first part while providing the first set to the first column of PEs over successive clock cycles. The first column of PEs may perform various tensor operations using the first set.

The first IPU 208*a* may sequentially forward the values of the first part to the second IPU 208*b* over successive clock cycles. For example, as shown in FIG. 4, the first IPU 208*a* may forward the first value ("a0") to the second IPU 208*b* during the second clock cycle 401*b* and may forward the second value ("a1") to the second IPU 208*b* during a third clock cycle 401*c*. In this manner, the first IPU 208*a* may concurrently apply values of the first part while providing the first set to the first column of PEs and forwarding other values to the second IPU 208*b* (e.g., the downstream IPU 208) over successive clock cycles.

The second IPU 208*b* may sequentially apply the received values of the first part to corresponding operands over successive clock cycles to produce a second set of the scaled operands (generally referred to in the present disclosure as the second set). For example, during the second clock cycle 401*b*, the second IPU 208*b* may apply the first value ("a0") to a corresponding first operand ("o10") from the second CSRAM 210*b* to produce a first scaled operand 411 ("S (o10,a0)") of the second set. As another example, during the third clock cycle 401*c*, the second IPU 208*b* may apply the second value ("a1") to a corresponding second operand ("o11") from the second CSRAM 210*b* to produce a second scaled operand 413 ("S(o11,a1)") of the second set. In this manner, the first IPU 208*a* and the second IPU 208*b* may concurrently apply values of the first part to different operands from the first CSRAM 210*a* and the second CSRAM 210*b*, respectively.

The second IPU 208*b* may sequentially provide the second set to the second column of PEs over successive clock cycles. For example, the second IPU 208*b* may sequentially provide the first scaled operand 411 and the second scaled operand 413 of the second set to the second column of the PEs during the third clock cycle 401*c* and a fourth clock cycle 401*d*, respectively. In this manner, the second IPU 208*b* may concurrently apply values of the first part while providing the second set to the second column of PEs over successive clock cycles. The second column of PEs may perform various tensor operations using the second set.

The second IPU 208*b* may sequentially forward the values of the first part to the third IPU 208*c* over successive clock cycles. For example, as shown in FIG. 4, the second IPU 208*b* may forward the first value ("a0") to the third IPU 208*c* during the third clock cycle 401*c* and may forward the second value ("a1") to the third IPU 208*c* during the fourth clock cycle 401*d*. In this manner, the second IPU 208*b* may concurrently apply values of the first part while providing the second set to the second column of PEs and forwarding other values to the third IPU 208*c* (e.g., the downstream IPU 208) over successive clock cycles.

The IPUs 208*a-n* may repeat this process for each of the values of the first part until each of the values of the first part has been applied by each of the IPUs 208*a-n* to corresponding operands. In this manner, the values of the first part may ripple through the IPUs 208*a-n* over successive clock cycles such that each of the IPUs 208*a-n* applies each value of the first part to the corresponding operands while forwarding other values of the first part to downstream IPUs of the IPUs 208*a-n* and providing corresponding scaled operands to the corresponding columns of PEs.

In this manner, the IPUs 208*a-n* may apply the values of the first part in parallel across multiple columns of the systolic array 112. For example, during a clock cycle at which the first IPU 208*a* applies a third value of the first part to a third operand from the first CSRAM 210*a*, the second IPU 208*b* may apply the second value of the first part to a second operand from the second CSRAM 210*b*, and the third IPU 208*c* may apply the first value of the first part to a first operand from the third CSRAM 210*c*. Therefore, after the first clock cycle 401*a*, multiple instances of the IPUs 208*a-n* may apply different values of the affine data 405 to the operands 403 in parallel during a single clock cycle, sustaining a high throughput rate across the systolic array 112 without introducing gaps in the tensor operations.

With reference to FIG. 2, the ISC 206 retrieving and applying the operand portion of the affine data in an alternating arrangement will now be discussed. As discussed above, the ISC 206 may retrieve the first part and provide the values of the first part to the first IPU 208*a*. While the ISC 206 is providing the values of the first part to the first IPU 208*a*, the ISC 206 may retrieve the values of a second part of the operand portion (generally referred to in the present disclosure as the second part). For example, while the ISC 206 provides the values of the first part from the first on-chip buffer to the first IPU 208*a*, the ISC 206 may concurrently retrieve and store the values of the second part in the second on-chip buffer.

Upon exhaustion of the values of the first part, the ISC 206 may switch and provide the values of the second part. For example, the ISC 206 may switch and provide the values of the second part from the second on-chip buffer to the first IPU 208*a*. The ISC 206 may continue this alternating arrangement in which the ISC 206 retrieves and stores subsequent parts of the operand portion while providing the values of prior parts of the operand portion to the first IPU 208*a*. This alternating arrangement may allow the ISC 206 to hide the latency of the off-chip memory 204, thereby reducing or eliminating gaps in the tensor operations of the systolic array 112.

While the ISC 206 is providing the values of a last part of the operand portion to the first IPU 208*a*, the ISC 206 may retrieve the values of a first part of the affine data corresponding to the results (e.g., a first part of the result portion of the affine data) in preparation for the system 200 to start scaling the results from the systolic array 112. Upon exhaustion of the values of the last part of the operand portion, the ISC 206 may switch and provide the values of the first part of the result portion to the first IPU 208*a*. After retrieving and storing the first part of the result portion, the ISC 206 may individually retrieve and store subsequent values of the result portion in a sequential arrangement.

In some embodiments, the on-chip memory of the ISC 206 (e.g., the operand on-chip memory 312 or the result on-chip memory 314) may retain previously retrieved transformation parameters across multiple passes of the compute array. For example, the systolic array 112 may execute a first pass using a first set of weights and then execute a second pass using a second set of weights, while the same affine data (e.g., the same transformation parameters) is applied during both passes. Rather than re-retrieving the affine data from the off-chip memory 204 for the second pass, the ISC 206 may re-stream the affine data from the on-chip memory to the first IPU 208*a*, thereby conserving bandwidth of the off-chip memory 204 and avoiding additional latency. More generally, the controller may retain previously retrieved transformation parameters in the on-chip memory and re-provide the retained transformation parameters to the chain of processing units for a subsequent pass of the compute array without re-retrieving the transformation parameters from the external memory.

The ISC 206, the CSRAMs 210*a-n*, and the IPUs 208*a-n* may repeat the process described above but in relation to the results from the columns of the PEs instead of the operands from the CSRAMs 210*a-n* and the values of the result portion instead of the operand portion to generate scaled results. The IPUs 208*a-n* may provide the scaled results to downstream devices for subsequent operations.

The IPUs 208*a-n* may repeat this process for each of the values of the result portion until each of the values has been applied by each of the IPUs 208*a-n*. In this manner, the values of the first part may ripple through the IPUs 208*a-n* over successive clock cycles such that each of the IPUs 208*a-n* applies each value of the result portion to corresponding results while forwarding other values of the result portion to downstream IPUs of the IPUs 208*a-n* and providing corresponding scaled results to the downstream devices over successive clock cycles.

In some embodiments, the IPUs 208*a-n* may apply the values of the affine data by multiplying corresponding operands or corresponding results by corresponding scale values to get products. The products may be added to corresponding bias values.

Figure 3:
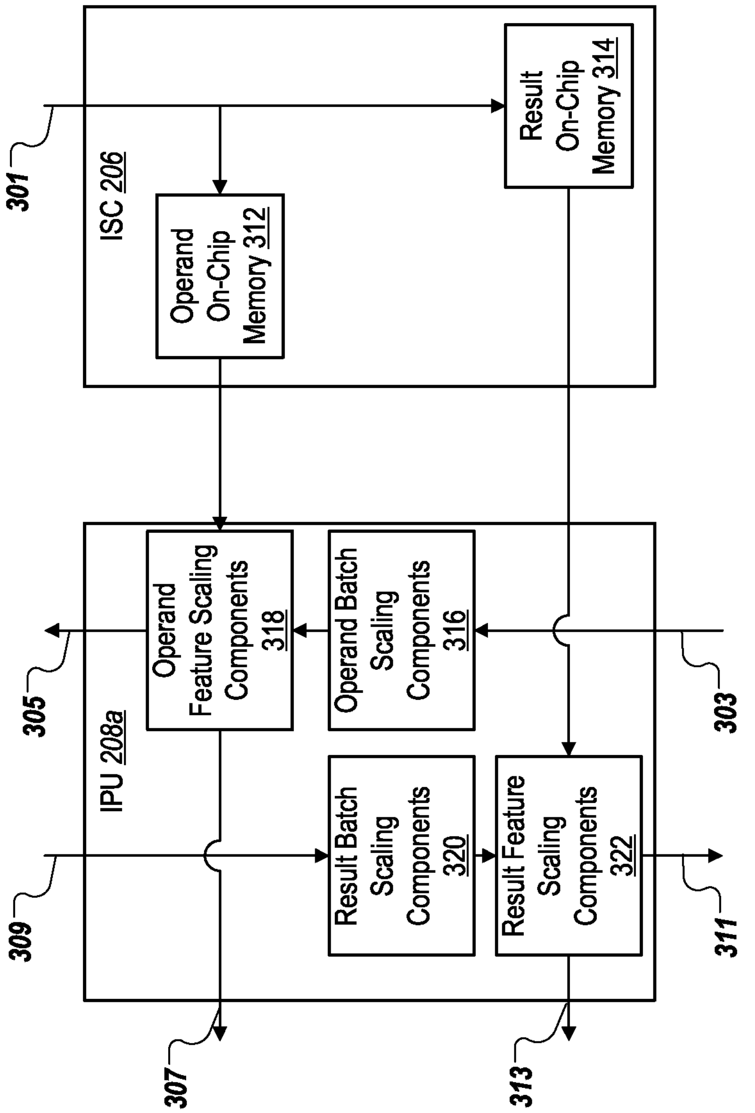
FIG. 3 illustrates a block diagram of an example of the controller (e.g., an ISC) and a first processing unit (e.g., the first IPU) of FIG. 2.

FIG. 3 illustrates a block diagram of an example of the ISC 206 and the first IPU 208*a* of FIG. 2, in accordance with at least one embodiment of the present disclosure. The first IPU 208*a* may be configured to operate using values of the affine data that include batch values and model values. The batch values may include a batch scale value for each column of the systolic array 112 and batch bias values that are specific to computations involving the operands or the results. The model values may include model scale values and model bias values that are specific to computations involving the operands or the results. As shown in FIG. 3, the example ISC 206 includes an operand on-chip memory 312 and a result on-chip memory 314. The operand on-chip memory 312 and the result on-chip memory 314 may include buffers or caches configured to store the values of the affine data.

With combined reference to FIGS. 2 and 3, the ISC 206 may send a request for a part of the affine data to the off-chip memory 204 to retrieve the values of the part of the affine data. The operand on-chip memory 312 or the result on-chip memory 314 may receive the values of the part of the affine data via line 301 in FIG. 3. The ISC 206 may store the values in the operand on-chip memory 312 or the result on-chip memory 314 depending on if the part of the affine data corresponds to the operands or the results. If the part of the affine data corresponds to the operands, the ISC 206 may store the part of the affine data in the operand on-chip memory 312. If the part of the affine data corresponds to the results, the ISC 206 may store the part of the affine data in the result on-chip memory 314.

The first IPU 208*a* may include operand batch scaling components 316 (e.g., a first scaling stage) configured to receive the operands from the first CSRAM 210*a* (not shown in FIG. 3) via line 303 in FIG. 3. The operand batch scaling components 316 may apply the corresponding batch scale value (e.g., batch-specific parameters) and the batch bias values to the operands over successive clock cycles. For example, the operand batch scaling components 316 may apply the corresponding batch scale value and a first batch bias value to a first operand from the first CSRAM 210*a* during a first clock cycle and the corresponding batch scale value and a second batch bias value to a second operand from the first CSRAM 210*a* during a second clock cycle. As used herein, "batch-specific parameters" refers to transformation parameters (e.g., batch scale values or batch bias values) that are derived from or specific to a particular batch of data.

The batch scale value may be specific to the first column of the systolic array 112 and the batch bias values may be specific to the operands. In some embodiments, the batch scale value and the batch bias values for the operands may be received as part of the affine data. In other embodiments, the batch scale value and the batch bias values for the operands may include normalized values that are calculated from computations of each operand that are applied to subsequent operands. The batch scale value and the batch bias values may be applied to the operands to address issues related to operand magnitude.

The first IPU 208*a* may include operand feature scaling components 318 (e.g., a second scaling stage). The operand on-chip memory 312 may provide the values of the part of the affine data to the operand feature scaling components 318. The operand feature scaling components 318 may apply the model scale values (e.g., model-specific parameters) and the model bias values for the operands to outputs of the computations of the operand batch scaling components 316 over successive clock cycles to generate the scaled operands. The model scale values and the model bias values for the operands may include values that are learned during training of the related transformer model and then stored in the off-chip memory 204. As used herein, "model-specific parameters" refers to transformation parameters (e.g., model scale values or model bias values) that are learned during training of a machine learning model and applied per dimension position.

The model scale values and the model bias values for the operands may correspond to both the operands and the results. Alternatively, the model scale values and the model bias values for the operands may be specific to the operands. The model scale values and the model bias values for the operands may be applied to the operands to address dimension related issues of the transformer model.

The operand feature scaling components 318 may provide the scaled operands to the first column of PEs (not shown in FIG. 3) via line 305 in FIG. 3. In addition, the operand feature scaling components 318 may forward the values of the affine data to the second IPU 208*b* (not shown in FIG. 3) via line 307 in FIG. 3. The second IPU 208*b* and the other IPUs 208_c-n_ may include similar components as the first IPU 208_a_. The second IPU 208_b_ and the other IPUs 208_c-n_ may perform similar operations on the corresponding operands as the operand feature scaling components 318 and the operand batch scaling component 316 to generate additional scaled operands.

The first IPU 208_a_ may include result batch scaling components 320 configured to receive the results from the first column of PEs via line 309 in FIG. 3. The result batch scaling components 320 may apply the corresponding batch scale value and the batch bias values to the results over successive clock cycles. For example, the result batch scaling components 320 may apply the corresponding batch scale value and a first batch bias value to a first result from the first column of PEs during a first clock cycle and the corresponding batch scale value and a second batch bias value to a second result from the first column of PEs during a second clock cycle. In some embodiments, the corresponding batch scale value and the batch bias values may be programmed into the off-chip memory 204 during initialization of the transformer model to allow control over result scaling. The corresponding batch scale value may be specific to the first column of the systolic array 112 and the batch bias values may be specific to the results.

The first IPU 208_a_ may include result feature scaling components 322. The result on-chip memory 314 may provide the values of the part of the affine data to the result feature scaling components 322. The result feature scaling components 322 may apply the model scale values and the model bias values for the results to outputs of the computations of the result batch scaling components 320 over successive clock cycles to generate the scaled results. The model scale values and the model bias values for the results may include values that are learned during training of the related transformer model and then stored in the off-chip memory 204. The model scale values and the model bias values for the results may correspond to both the operands and the results. Alternatively, the model scale values and the model bias values for the results may be specific to the results. The model scale values and the model bias values for the results may be applied to the results to address dimension related issues of the transformer model.

The result feature scaling components 322 may provide the scaled results to the first CSRAM 210_a_ via line 311 in FIG. 3. In addition, the result feature scaling components 322 may forward the values of the affine data to the second IPU 208_b_ via line 313 in FIG. 3. The second IPU 208_b_ and the other IPUs 208_c-n_ may include similar components as the first IPU 208_a_. The second IPU 208_b_ and the other IPUs 208_c-n_ may perform similar operations on the corresponding results as the result batch scaling components 320 and the result feature scaling component 322 to generate additional scaled results.

Figure 5:
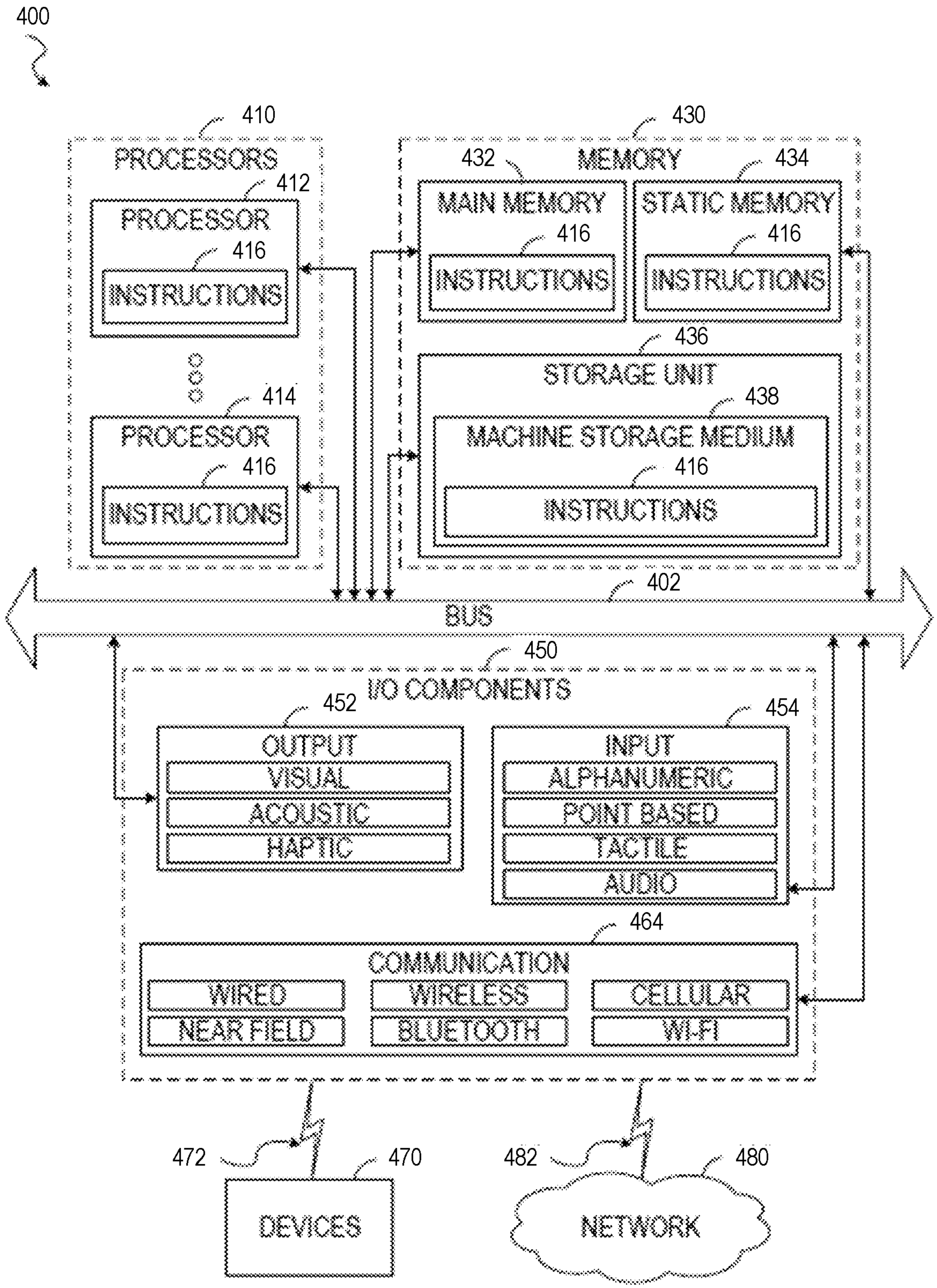
FIG. 5 illustrates a diagrammatic representation of a machine in the form of a computer system within which a set of instructions may be executed for causing the machine to perform any one or more of the methodologies discussed herein, all according to at least one embodiment described in the present disclosure.

FIG. 5 illustrates a diagrammatic representation of a machine 400 in the form of a computer system within which a set of instructions may be executed for causing the machine 400 to perform any one or more of the methodologies discussed herein, in accordance with one or more embodiments described herein. Specifically, FIG. 5 shows a diagrammatic representation of the machine 400 in the example form of a computer system, within which instructions 416 (e.g., software, a program, an application, an applet, an app, or other executable code) for causing the machine 400 to perform any one or more of the methodologies discussed herein may be executed. For example, the instructions 416 may cause the machine 400 to execute any one or more operations of method(s) described before. As another example, the instructions 416 may cause the machine 400 to execute or control some or all of the scaling operations described herein. In this way, the instructions 416 transform a general, non-programmed machine into a particular machine 400 (e.g., the processing device 110) that is specially configured to carry out any one of the described and/or illustrated functions in the manner described herein.

In some embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may include a server computer, a client computer, a personal computer (PC), a tablet computer, a laptop computer, a netbook, a smart phone, a mobile device, a network router, a network switch, a network bridge, or any machine capable of executing the instructions 416, sequentially or otherwise, that specify actions to be taken by the machine 400. Further, while only a single machine 400 is illustrated, the term "machine" shall also be taken to include a collection of machines 400 that individually or jointly execute the instructions 416 to perform any one or more of the methodologies discussed herein. In some embodiments, the machine 400 may be part of any of the systems or devices described in this disclosure.

The machine 400 includes processors 410, memory 430, and input/output (I/O) components 450 configured to communicate with each other such as via a bus 402. In an example embodiment, the processors 410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 412 and a processor 414 that may execute the instructions 416. The term "processor" is intended to include multi-core processors 410 that may comprise two or more independent processors (sometimes referred to as "cores") that may execute instructions 416 contemporaneously. Although FIG. 5 shows multiple processors 410, the machine 400 may include a single processor with a single core, a single processor with multiple cores (e.g., a multi-core processor), multiple processors with a single core, multiple processors with multiple cores, or any combination thereof.

The memory 430 may include a main memory 432, a static memory 434, and a storage unit 436, all accessible to the processors 410 such as via the bus 402. The main memory 432, the static memory 434, and the storage unit 436 store the instructions 416 embodying any one or more of the methodologies or functions described herein. The instructions 416 may also reside, completely or partially, within the main memory 432, within the static memory 434, within machine storage medium 438 of the storage unit 436, within at least one of the processors 410 (e.g., within the processor's cache memory), or any suitable combination thereof, during execution thereof by the machine 400.

The I/O components 450 may include components to receive input, provide output, produce output, transmit information, exchange information, capture measurements, and so on. The specific I/O components 450 that are included in a particular machine 400 will depend on the type of machine. For example, portable machines such as mobile phones will likely include a touch input device or other such input mechanisms, while a headless server machine will likely not include such a touch input device. It will be appreciated that the I/O components 450 may include many other components that are not shown in FIG. 5. The I/O components 450 are grouped according to functionality merely for simplifying the following discussion. In various example embodiments, the I/O components 450 may include output components 452 and input components 454. The output components 452 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 450 may include communication components 464 operable to couple the machine 400 to a network 480 or devices 470 via a coupling 482 and a coupling 472, respectively. For example, the communication components 464 may include a network interface component or another suitable device to interface with the network 480. In further examples, the communication components 464 may include wired communication components, wireless communication components, cellular communication components, and other communication components to provide communication via other modalities. The devices 470 may be another machine or any of a wide variety of peripheral devices (e.g., a peripheral device coupled via a universal serial bus (USB)). For example, as noted above, the machine 400 may correspond to, e.g., the processing device 110, and the devices 470 may include another or different processing device 110.

The various memories (e.g., 430, 432, 434, and/or memory of the processor(s) 410 and/or the storage unit 436) may store one or more sets of instructions 416 and data structures (e.g., software) embodying or utilized by any one or more of the methodologies or functions described herein. These instructions 416, when executed by the processor(s) 410, cause various operations to implement the disclosed embodiments.

Modifications, additions, or omissions may be made to the machine 400 without departing from the scope of the present disclosure. For example, in some embodiments, the machine 400 may include any number of other components that may not be explicitly illustrated or described. Further, depending on certain implementations, the machine 400 may not include one or more of the components illustrated and described.

Embodiments described in the present disclosure may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are described as example forms of implementing the claims.

In some embodiments, the affine transformation applied by the processing units may include a degenerate case in which only a scale value is applied without a bias value, or only a bias value is applied without a scale value. Accordingly, references to "affine data" or "transformation parameters" herein encompass scale-only transformations, bias-only transformations, and combined scale-and-bias transformations.

While embodiments described herein may reference high-bandwidth memory (HBM) as the off-chip memory, more generally, any off-chip or external memory technology may be used, including but not limited to DDR4, DDR5, LPDDR5, LPDDR5X, GDDR6, GDDR7, thyristor random access memory (TRAM), CXL-attached memory, or any other memory technology capable of storing transformation parameters.

While embodiments described herein may reference systolic arrays, more generally, any parallel compute array architecture capable of performing matrix multiplication or tensor operations may be used, including but not limited to matrix engines, dot-product engines, tensor processing units, vector processing units, or similar hardware structures.

While embodiments described herein may reference intermediate processing units (IPUs) and an IPU and systolic array controller (ISC), more generally, any processing units and controller capable of cascaded distribution of transformation parameters may be used.

In some embodiments, a method of applying scaling transformations to data associated with matrix operations includes retrieving transformation parameters (e.g., affine data) from an external memory, sequentially providing values of the transformation parameters to a first processing unit of a plurality of processing units coupled in a chain (each processing unit associated with a different portion of a compute array), and sequentially forwarding the values from the first processing unit to downstream processing units along the chain over successive time intervals. Each processing unit applies the received transformation parameters to data passing through the corresponding portion of the compute array. The method may further include operating a double-buffered on-chip memory in the controller such that while the controller provides transformation parameters from a first buffer, a second buffer concurrently receives subsequent transformation parameters from the external memory.

As used in the present disclosure, terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A system comprising: a compute array configured to perform matrix operations; a plurality of processing units arranged in a chain, each processing unit associated with a respective portion of the compute array; and a controller configured to retrieve transformation parameters from a memory and sequentially provide values of the transformation parameters to a first processing unit of the chain over a plurality of successive time intervals, wherein the plurality of processing units sequentially forward the values of the transformation parameters to downstream processing units along the chain, and each processing unit applies the values of the transformation parameters to data associated with the matrix operations at the respective portion.

2. The system of claim 1, wherein the controller comprises a double-buffered on-chip memory including a first buffer and a second buffer, the double-buffered on-chip memory configured to operate in an alternating arrangement such that while the controller provides the values of a first portion of the transformation parameters from the first buffer, the second buffer concurrently receives and stores the values of a second portion of the transformation parameters from the memory.

3. The system of claim 1, wherein the data comprises operands provided to the compute array for the matrix operations.

4. The system of claim 1, wherein the data comprises results generated by the compute array from the matrix operations.

5. The system of claim 1, wherein the transformation parameters comprise a scale value without a corresponding bias value.

6. The system of claim 1, wherein the transformation parameters comprise a scale value and a bias value.

7. The system of claim 1, wherein the compute array comprises a systolic array and each portion of the compute array comprises a different column of the systolic array.

8. The system of claim 1, wherein each processing unit comprises a first scaling stage configured to apply batch-specific parameters to the data.

9. The system of claim 8, wherein each processing unit further comprises a second scaling stage configured to apply model-specific parameters to an output of the first scaling stage.

10. The system of claim 1, wherein the controller is configured to retrieve, from the memory, transformation parameters corresponding to results of the matrix operations while the plurality of processing units applies transformation parameters corresponding to operands of the matrix operations to data provided to the compute array.

11. The system of claim 1, wherein the controller retains the transformation parameters in an on-chip memory and re-provides the retained transformation parameters to the first processing unit for a subsequent pass of the compute array without re-retrieving the transformation parameters from the memory.

12. The system of claim 1, wherein the controller comprises a first on-chip memory configured to store transformation parameters corresponding to operands of the matrix operations and a second on-chip memory, separate from the first on-chip memory, configured to store transformation parameters corresponding to results of the matrix operations.

13. The system of claim 1, wherein the sequential forwarding of the values of the transformation parameters along the chain amortizes a retrieval latency of the memory across the plurality of processing units.

14. The system of claim 1, wherein each processing unit concurrently applies a received value of the transformation parameters to corresponding data, provides scaled data to the respective portion of the compute array, and forwards the received value to a downstream processing unit along the chain.

15. A method comprising: retrieving transformation parameters from a memory; sequentially providing values of the transformation parameters to a first processing unit of a plurality of processing units arranged in a chain, each processing unit associated with a respective portion of a compute array configured to perform matrix operations; and sequentially forwarding the values of the transformation parameters from the first processing unit to downstream processing units along the chain over a plurality of successive time intervals, wherein each processing unit applies the values of the transformation parameters to data associated with the matrix operations at the respective portion of the compute array.

16. The method of claim 15, further comprising operating a double-buffered on-chip memory in an alternating arrangement such that while providing the values of a first portion of the transformation parameters from a first buffer, a second buffer concurrently receives and stores a second portion of the transformation parameters from the memory.

17. The method of claim 15, wherein the data comprises operands being provided to the compute array for the matrix operations.

18. The method of claim 15, wherein the data comprises results generated by the compute array from the matrix operations.

19. The method of claim 18, further comprising performing an initial bulk retrieval of a first portion of the transformation parameters corresponding to the results, and subsequently retrieving remaining transformation parameters individually in a sequential arrangement to compensate for memory retrieval latency.

20. The method of claim 15, wherein the transformation parameters comprise a scale value and a bias value.

21. The method of claim 15, wherein each processing unit applies batch-specific parameters in a first scaling stage.

22. The method of claim 21, wherein each processing unit further applies model-specific parameters in a second scaling stage subsequent to the first scaling stage.

23. A hardware accelerator comprising: a compute array configured to perform matrix operations; a plurality of processing units arranged in a chain and coupled to the compute array, each processing unit associated with a respective portion of the compute array and configured to apply transformation parameters to data associated with the matrix operations, wherein values of the transformation parameters are sequentially forwarded from a first processing unit to downstream processing units along the chain over a plurality of successive time intervals; and a controller comprising a multi-buffered on-chip memory and configured to retrieve the transformation parameters from an off-chip memory, wherein while the controller provides a first portion of the transformation parameters from a first buffer of the multi-buffered on-chip memory to the first processing unit, a second buffer of the multi-buffered on-chip memory concurrently receives a second portion of the transformation parameters from the off-chip memory.

24. The hardware accelerator of claim 23, wherein the multi-buffered on-chip memory is configured to operate in an alternating arrangement such that, upon exhausting the values in the first buffer, the controller switches to provide values from the second buffer while the first buffer concurrently receives a subsequent portion of the transformation parameters from the off-chip memory.

25. The hardware accelerator of claim 23, wherein the data comprises operands provided to the compute array for the matrix operations.

26. The hardware accelerator of claim 23, wherein the data comprises results generated by the compute array from the matrix operations.

27. A non-transitory computer-readable medium storing instructions that, when executed by one or more processors, cause the one or more processors to perform operations comprising: retrieving transformation parameters from a memory; sequentially providing values of the transformation parameters to a first processing unit of a plurality of processing units arranged in a chain, each processing unit associated with a respective portion of a compute array configured to perform matrix operations; and sequentially forwarding the values of the transformation parameters from the first processing unit to downstream processing units along the chain over a plurality of successive time intervals, wherein each processing unit applies the values of the transformation parameters to data associated with the matrix operations at the respective portion of the compute array.

28. The non-transitory computer-readable medium of claim 27, wherein the operations further comprise operating a double-buffered on-chip memory in an alternating arrangement such that while providing the values of a first portion of the transformation parameters from a first buffer, a second buffer concurrently receives and stores a second portion of the transformation parameters from the memory.

29. The non-transitory computer-readable medium of claim 27, wherein the transformation parameters comprise a scale value and a bias value.

30. The non-transitory computer-readable medium of claim 27, wherein each processing unit applies batch-specific parameters in a first scaling stage and model-specific parameters in a second scaling stage subsequent to the first scaling stage.

* * * * *